(12) United States Patent
Jenkins et al.

(10) Patent No.: US 7,342,977 B2
(45) Date of Patent: Mar. 11, 2008

(54) SERIAL DATA TRANSMITTER WITH BIT DOUBLING

(75) Inventors: Michael O. Jenkins, San Jose, CA (US); Brett D. Hardy, Chaska, MN (US); Francois Ducaroir, Santa Clara, CA (US); Michael Okronglis, Bloomington, MN (US)

(73) Assignee: LSI Logic Corporation, Milpitas, CA (US)

( * ) Notice: Subject to any disclaimer, the term of this patent is extended or adjusted under 35 U.S.C. 154(b) by 826 days.

(21) Appl. No.: 10/304,922

(22) Filed: Nov. 26, 2002

(65) Prior Publication Data
US 2004/0101064 A1 May 27, 2004

(51) Int. Cl.
 *H04L 27/00* (2006.01)
 *H04L 12/50* (2006.01)
 *H03M 9/00* (2006.01)

(52) U.S. Cl. ............... 375/295; 341/100; 341/101; 370/366

(58) Field of Classification Search .......... 375/295, 375/354, 358, 356, 355, 375–376, 326, 340, 375/242, 262, 265, 225, 226, 377, 395; 370/304, 370/503, 375, 380, 381, 386, 369–371, 428, 370/429, 535, 537, 540, 543, 542, 544, 539, 370/541, 534, 532, 350, 366; 327/147, 144, 327/156, 407, 297; 711/102–104, 129–130, 711/147–149, 170–173; 341/155, 101, 143, 341/110, 144, 100; 716/6
See application file for complete search history.

(56) References Cited

U.S. PATENT DOCUMENTS

| 4,607,345 | A | * | 8/1986 | Mehta ..................... 710/61 |
| 5,440,684 | A | * | 8/1995 | Tack et al. ................ 345/560 |
| 5,574,676 | A | * | 11/1996 | Lee et al. .................. 708/551 |
| 5,896,374 | A | * | 4/1999 | Okumura et al. ........... 370/311 |
| 6,040,791 | A | * | 3/2000 | Kassmann ................. 341/95 |
| 6,232,895 | B1 | * | 5/2001 | Djupsjobacka et al. ..... 341/100 |
| 6,642,864 | B1 | * | 11/2003 | Djupsjobacka et al. ..... 341/100 |
| 7,106,227 | B2 | * | 9/2006 | Karlquist .................. 341/101 |
| 2003/0223469 | A1 | * | 12/2003 | Deng ........................ 370/542 |
| 2005/0204245 | A1 | * | 9/2005 | Lee et al. ................... 714/744 |

* cited by examiner

*Primary Examiner*—Mohammed Ghayour
*Assistant Examiner*—Sophia Vlahos
(74) *Attorney, Agent, or Firm*—Westman Champlin & Kelly

(57) ABSTRACT

A method is provided for transmitting serial data. The method includes receiving successive transmit data words, wherein each transmit data word has a plurality of bits. Each of the plurality of bits in each transmit data word is multiplied into a multiple number of adjacent bits to form an expanded data word. Each of the expanded data words is serialized to form a serial data word stream, which is transmitted.

15 Claims, 3 Drawing Sheets

SERIAL DATA TRANSMITTER WITH BIT DOUBLING

BACKGROUND OF THE INVENTION

The present invention relates to serial data transmitters and, more particularly, to a serial data transmitter that is capable of operating over a wide range of data rates.

A serial data transmitter has a parallel-to-serial converter, known as a "serializer", which receives successive multiple-bit data words, converts each data word into a serial representation and concatenates the serial representations to produce a serial bit stream. The serial bit stream output can be single-ended or differential, depending upon the application in which the transmitter is used. The transmitting device also typically includes a receiver that de-serializes incoming data from the transmission media. The serializer typically includes a phase-locked loop (PLL), which locks the rate that each bit is transmitted to a reference clock frequency. The de-serializer also has a PLL, which locks a local clock signal on to the phase and frequency of the data transitions in the serial data stream. The local clock signal is then used capture the incoming data.

As the performance of computer systems increases with each new system generation, serial data communication speed, measured in data rate, typically increases by a factor of two. To maintain backward compatibility with older systems, the serializer and de-serializer are required to operate over wider and wider ranges of data rates. For example, the same serializer and deserializer may be required to operate at 1 gigabits per second (Gb/s), 2 Gb/s or 4 Gb/s, depending on the application in which the device is used. This design requirement forces troublesome design compromises, particularly within the phase-locked loop of the transmitter.

Typically, data is serialized and de-serialized at a frequency that is directly proportional to the data rate. For example, the serializer and deserializer are required to operate twice as fast when transmitting or receiving data at 2 Gb/s than at 1 Gb/s and four times as fast at 4 Gb/s. With the increased range of required data rates, it becomes more and more difficult to design a serializer/deserializer. The design of the PLL that is used for regulating the transmission rate becomes particularly difficult.

For applications employing data rate switching, such as Fibre Channel speed auto-negotiation, switching of the transmit data rate requires a long time period, on the order of hundreds of microseconds, to change the PLL output frequency of the transmitter. In addition, PLL parameters are ideally optimized for jitter performance at a particular data rate. Optimizing the PLL parameters becomes more difficult when the PLL is required to operate at a wide range of data rates.

Also, the design of digital filters in the transmitter becomes more difficult with wider ranges of data rates. Digital filters are commonly used in transmitters for compensating for frequency-dependent losses in a transmission path. While the characteristics of the transmission path are constant, the digital filter characteristics must necessarily change with the data rate. This forces design compromises within the digital filter.

Improved data transmitters are therefore desired, which are capable of operating at a wide range of data rates without compromising the transmitter performance.

SUMMARY OF THE INVENTION

One embodiment of the present invention is directed to a method for transmitting serial data. The method includes: a) receiving successive transmit data words, wherein each transmit data word has a plurality of bits; b) multiplying each of the plurality of bits in each transmit data word into a multiple number of adjacent bits to form an expanded data word; c) serializing each of the expanded data words formed in step b) to form a serial data word stream; d) transmitting the serial data word stream.

Another embodiment of the present invention is directed to a method of transmitting data, which includes: a) selecting between first and second transmit frequencies as a desired transmit frequency, wherein the second transmit frequency is a multiple number of the first transmit frequency; b) receiving successive transmit data words, wherein each transmit data word has a plurality of bits; c) multiplying each of the plurality of bits in each transmit data word into multiple adjacent bits to form an expanded data word, if the desired transmit frequency is the first transmit frequency, wherein the number of adjacent bits in the expanded data word for each bit in the transmit data word is equal to the multiple number; d) serializing the expanded data words formed in step c) if the desired transmit frequency is the first transmit frequency, or the transmit data words received in step b) if the desired transmit frequency is the second transmit frequency to form a serial data word stream; and e) transmitting the serial data word stream at the second transmit frequency, regardless of the desired transmit frequency.

Another embodiment of the present invention is directed to data transmitter. The data transmitter includes a parallel transmit data input for receiving successive transmit data words having a plurality of bits. A transmit register is coupled to the parallel data input for storing the successive transmit data words. A bit repeating circuit is coupled to the transmit register, which repeats each of the plurality of bits in each transmit data word to form a multiple number of adjacent bits within an expanded data word and applies the expanded data word to a parallel transmit data output. A data serializer is coupled to the parallel transmit data output and has a serial data output.

DETAILED DESCRIPTION OF ILLUSTRATIVE EMBODIMENTS

The present invention is directed to a serial data transmitter. In one embodiment of the present invention, the transmitter always runs at a narrow range of frequencies corresponding to the maximum supported data rate of the transmitter, such as 2 gigabits per second (Gb/s). To achieve a lower data rate, the transmitter serializes each bit multiple times (i.e., "over-samples" the data). For example, if the maximum data rate is 2 Gb/s, then data can be transmitted at 1 Gb/s by transmitting each bit of data twice at 2 Gb/s. If the maximum data rate is 4 Gb/s, data can be transmitted at 1 Gb/s by transmitting each bit of data four times at 4 Gb/s. The resulting serial output waveforms are the same, and the receiver would still operate normally, locking on to the data at the lower data rate.

For example, sending the serial data pattern,
0011111010
at 1.0625 Gb/s results in exactly the same nominal transmitter output waveform as sending the pattern,
00001111111111001100
at 2.125 Gb/s. Although the nominal transmitter output waveform is the same, there are significant advantages in operating the transmitter at a single frequency regardless of the data rate.

Figure 1:
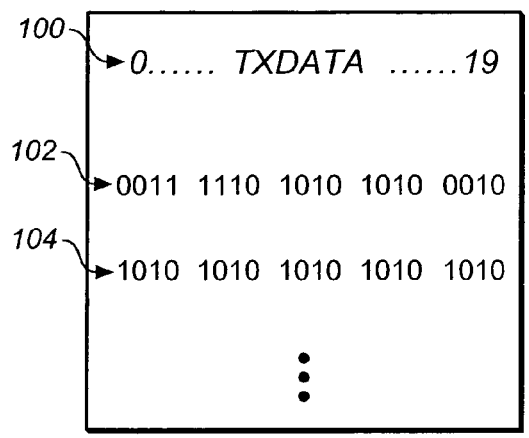
FIG. 1 schematically illustrates a transmit data pattern transmitted at 1.0625 Gb/s using a 53.125 MHz reference clock.

FIG. 1 is a diagram, which schematically illustrates the transmission of two 20-bit parallel data words TXDATA[0:19] at 1.0625 Gb/s using a 53.125 MHz reference clock. Row 100 represents the relative bit positions of each 20-bit data word. Row 102 represents the 20-bit binary pattern of the first data word, corresponding to the hexadecimal value "3EAA2". Row 104 represents the 20-bit binary pattern of the second data word, corresponding to hexadecimal value "AAAAA". In a typical transmitter, data words 102 and 104 are serialized and then transmitted at 1.0625 Gb/s. The phase-locked loop (PLL) that serializes data words 102 and 104 operates to transmit 20 serial bits within each cycle of the 53.125 MHz reference clock.

Figure 2:
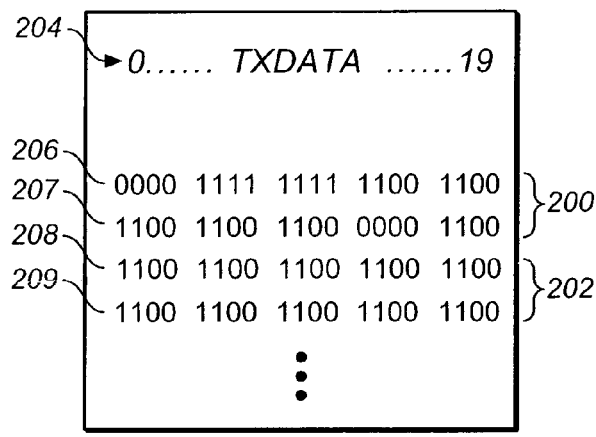
FIG. 2 schematically illustrates a transmit data pattern transmitted at 2.125 Gb/s using a 106.25 MHz reference clock.

FIG. 2 is a diagram illustrating expanded data words 200 and 202, which are transmitted at 2.125 Gb/s using a 106.25 MHz reference clock, wherein each bit is transmitted twice. Row 204 represents the relative bit positions of each 20-bit portion of the expanded data words 200 and 202. Row 206 represents a first portion of expanded data word 200, and row 207 represents a second portion of expanded data word 200. Row 208 represents a first portion of expanded data word 202, and row 209 represents a second portion of expanded data word 202.

Each bit in data words 102 and 104 (shown in FIG. 1) is repeated to form two adjacent, identical bits in expanded data words 202 and 204. The hexadecimal data words 3EAA2 and AAAAA are expanded into hexadecimal data words 0FFCC CCC0C and CCCCC CCCCC. Each expanded data word portion 206-209 is then serialized and transmitted at a higher rate, such as 2.125 Gb/s, using a 106.25 MHz reference clock.

The examples shown in FIGS. 1 and 2, produce exactly the same nominal transmitter output waveform. The receiver would receive two 20-bit data word transfers with a 53.125 MHz receive clock. In this example, the two 20-bit receive data words would be the original unexpanded hexadecimal data words 3EAA2 and AAAAA.

Transmitting each bit multiple times allows the transmitter to operate at a single frequency corresponding to the maximum required data rate regardless of the rate at which the receiver operates. This allows the transmitter data rate to be placed near the center of the transmitter frequency range, thereby allowing the PLL parameters in the transmitter to be optimized for better jitter performance at this speed. Switching data rates can be accomplished almost instantaneously by controlling the number of times each bit is repeated rather than by changing the frequency at which the transmitter PLL operates.

Figure 3:
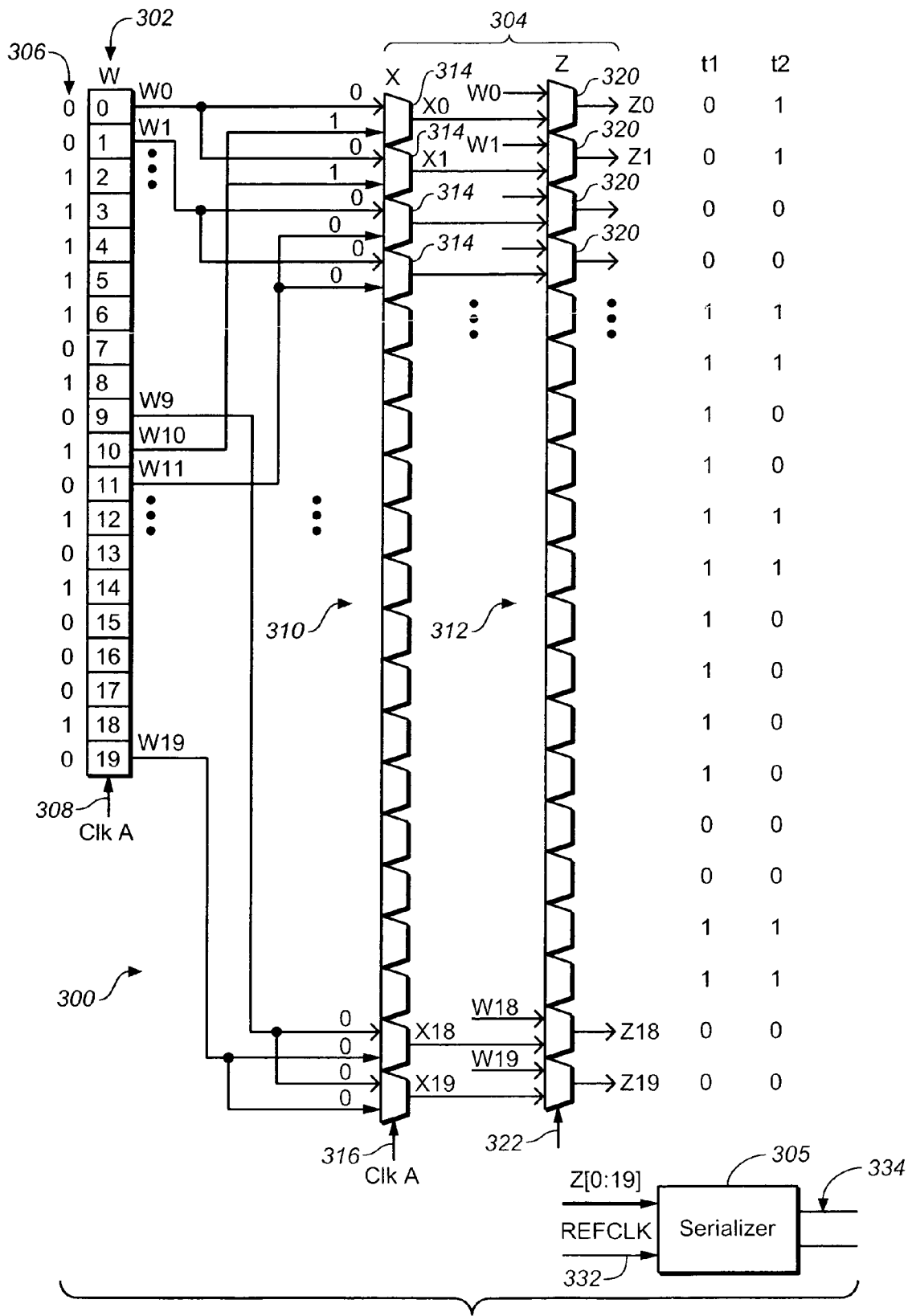
FIG. 3 is a block diagram of a serial data transmitter according to one embodiment of the present invention.

FIG. 3 is a block diagram illustrating a serial data transmitter 300, which provides selective repetition of bits according to one embodiment of the present invention. Transmitter 300 includes a transmit register 302, a bit repeating circuit 304 and a serializer 305. Transmit register 302 has 20 bit locations, "0" to "19". The outputs of transmit register 302 are labeled W0 to W19 and can be collectively referred to as W[0:19]. Transmit register 302 receives successive 20-bit data words for transmission through transmitter 300. Bit pattern 306 represents a 20-bit data word that can be loaded into transmit register 302. In this example, data word 306 corresponds to the hexadecimal value 3EAA2.

Register 302 has a clock input 308 for loading each successive data word into the register. Clock input 308 receives a clock signal, CLKA, which corresponds to the desired transmit frequency of each 20-bit data word. For example, if the desired data rate were 1.0625 Gb/s, then CLKA would have a frequency of 53.125 MHz. If the desired data rate were 2.125 Gb/s, then CLKA would have a frequency of 106.25 MHz.

Bit repeating circuit 304 includes a bit doubling multiplexer 310 and a bypass multiplexer 312. In this example, bit doubling multiplexer 310 has 10 pairs of adjacent two-input multiplexer elements 314. Each pair of multiplexer elements 314 has a first input coupled to a corresponding one of the bit locations in a first half (or subset) of register 302 (bit locations 0-9) and a second input coupled to a corresponding one of the bit locations in a second half (or subset) of register 302 (bit locations 10-19).

In order to double each bit in register 302, each bit in the first half of register 302 is coupled to the first input of a corresponding pair of the multiplexer elements 314, and each bit in the second half of register 302 is coupled to the second input of a corresponding pair of the multiplexer elements 314. For example, bit "0" is coupled to the first inputs of the first and second elements 314 in bit doubling multiplexer 310. Bit "1" in register 302 is coupled to the first inputs of the third and fourth elements 314 in bit doubling multiplexer 310. This pattern repeats for bit locations 2-9. Bit "10" in the second half of register 302 is coupled to the second inputs of the first and second elements in bit doubling multiplexer 310. Bit "11" is coupled to the second inputs of the third and fourth elements 314 in bit doubling multiplexer 310. Again, this pattern repeats for bit locations 12-19. Multiplexer elements 314 have outputs X0 to X19, respectively, which can be collectively referred to as X[0:19].

Multiplexer elements 314 have a common select input 316, which in this example is coupled to clock signal CLKA. When CLKA is in a first logic state, multiplexer elements 314 double each of bits W[0:9] in the first half of register 302 and pass the expanded bit pattern to outputs X[0:19]. When CLKA is in a second logic state, multiplexer elements 314 double each of bits W[10:19] in the second half of register 302 and pass the expanded bit pattern to outputs X[0:19]. Bit doubling multiplexer 310 therefore sequentially selects between first and second subsets of the bits in transmit register 302 (W[0:9] and W[10:19]) and for each subset, multiplies each of the bits in that subset into a multiple number of adjacent bits to form a portion of an expanded data word. The number of subsets is equal to the multiple number of adjacent bits.

Bypass multiplexer 312 includes 20 two-input multiplexer elements 320. Multiplexer elements 320 each include a first input coupled a corresponding one of the bit locations in register 302, labeled W0 to W19, and a second input coupled to a respective output X0 to X19 of multiplexer elements 314. Multiplexer elements 320 have a common select input 322, which selects whether the outputs X[0:19] from bit doubling multiplexer 310 or the outputs W[0:19] of register 302 will be applied to selectively expanded outputs Z[0:19] for serialization and transmission to the receiver. The desired transmit frequency of transmitter 300 can be selected by simply controlling the state of select input 322. For example if the desired data rate were 2 Gb/s, select input 322 would be set so that bypass multiplexer 302 passes W[0:19] directly to serializer 305. If the desired data rate were 1 Gb/s, select input 322 would be set so that bypass multiplexer 302 passes X[0:19] to serializer 305.

Serializer 305 has a data input 330, which is coupled to outputs Z[0:19] of bypass multiplexer 312. Serializer 305 has a reference clock input 332 and a serial data output 334. Reference clock input 332 receives a reference clock having a frequency corresponding to the highest required data rate. In the example shown in FIG. 3, transmitter 300 is capable of transmitting data at 1.0625 Gb/s or 2.125 Gb/s. In order to transmit at 2.125 Gb/s, serializer 305 latches each successive data word on Z[0:19] into an internal register with each cycle of REFCLK. In this example, REFCLK has a frequency of 106.25 MHz in order to latch and then transmit data at 2.125 Gb/s. Serializer 305 converts each latched data word into a serial bit stream on output 334.

Therefore, in order to transmit 1 Gb/s data at the 2 Gb/s rate, the number of bits is doubled. Each bit is duplicated by bit doubling multiplexer 310 and then presented to serializer 305 at double the data rate. Serializer 305 then transmits the serial data at 2 Gb/s, with an effective rate of 1 Gb/s.

Any suitable serializer can be used in accordance with the present invention. For example in one embodiment, serializer 305 includes a GigaBlaze® Transceiver Core available from LSI Logic Corporation of Milpitas, Calif. Other types of serializers can also be used.

Figure 4:
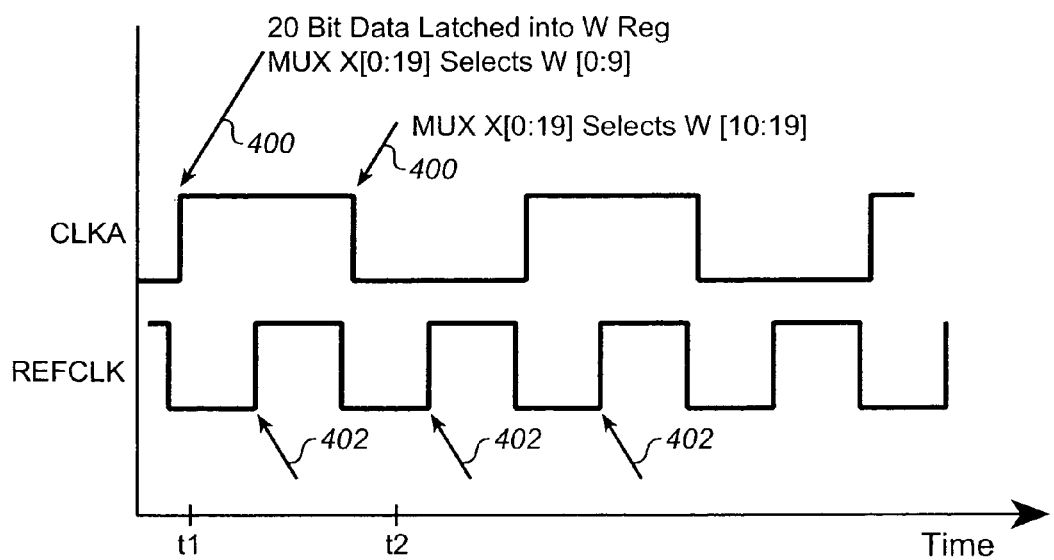
FIG. 4 is a waveform diagram illustrating clock waveforms used in the bit repeating circuit shown in FIG. 3.

FIG. 4 is a waveform diagram illustrating clock signals CLKA and REFCLK. CLKA has a frequency of 53.125 MHz, and REFCLK has a frequency of 106.25 MHz. For 1.0625 Gb/s operation, data is clocked into register 302 at the 53.125 MHz rate on each rising edge of CLKA, as shown by arrows 400. When CLKA is high, beginning at time t1, bit doubling multiplexer 310 selects W[0:9] so that the 10 bits from W[0:9] is expanded into 20-bits onto X[0:19]. Bypass multiplexer 312 passes the expanded output X[0:19] to Z[0:10], which is then latched by serializer 305. When CLKA is low, beginning at time t2, bit doubling multiplexer 310 selects W[10:19] so that the 10 bits from W[10:19] is expanded into 20 bits onto X[0:19], which is passed to output Z[0:10]. Serializer 305 latches Z[0:19] on each rising edge of REFCLK, as shown by arrows 402.

For 2.125 Gb/s operation, data is clocked into register 302 at the 106.25 MHz rate, as opposed to the 53.125 MHz rate. Because the data rate going into register 302 is already at 2.125 Gb/s, the bit doubling provided by bit doubling multiplexer 310 is not needed. Therefore, bypass multiplexer 312 is switched to select W[0:19] as opposed to X[0:19]. The 2.125 Gb/s data is therefore provided to serializer 305 directly from register 302.

With either the 1.0625 Gb/s rate or the 2.125 Gb/s rate, serializer 305 operates at the same 1.0625 MHz frequency and transmits each bit at 2.125 Gb/s. This allows serializer 305 to always run in a narrow range of frequencies, the highest frequency range required by any application in which serializer 305 is used. The PLL parameters in serializer 305 can therefore be set for optimum jitter performance at this speed. Lower data rates are achieved by transmitting or receiving each bit of data multiple times. This simplifies the design of serializer 305 and results in improved performance.

For applications employing data rate switching, such as speed auto-negotiation in the Fibre Channel protocol, switching between the single and double speed can be instantaneous, requiring only a change in the input data rate to register 302 and the setting of bypass multiplexer 312. In contrast, changing the rate at which a PLL operates would require a large amount of time in order to change the PLL output frequency.

In addition, transmitters often apply pre-emphasis on the serial outputs as a simple form of a digital filter to compensate for high frequency attenuation in the transmission path. As is known in the art, transmitter pre-emphasis works best when the emphasis is asserted for approximately the rise time of the transmitter-plus-transmission path. Hence for a given application, the optimal time to assert emphasis is a constant and independent of the data rate.

Figure 5:
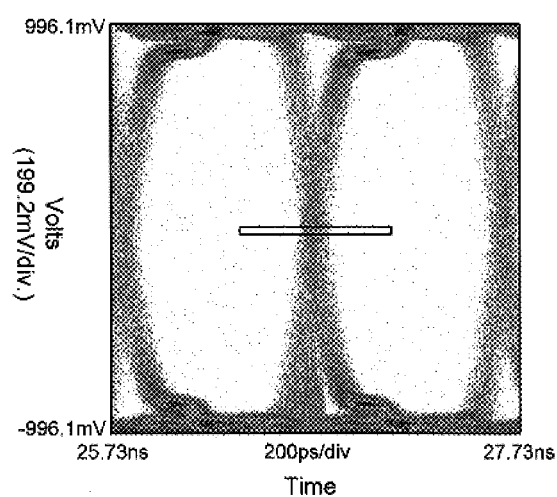
FIG. 5 is a waveform diagram illustrating a measured serial data output generated using a 53.125 MHz reference clock and with each bit being sent only once.

FIG. 5 is a waveform diagram illustrating a measured differential serial data output having pre-emphasis applied to a 1.0625 Gb/s bit stream for 941 picoseconds (ps), which is the unit interval at 1.0625 Gb/s. The waveform shown in FIG. 6 was generated by a GigaBlaze G12 transceiver in the normal fashion, with a 53.125 MHz reference clock and each bit being sent only once.

Figure 6:
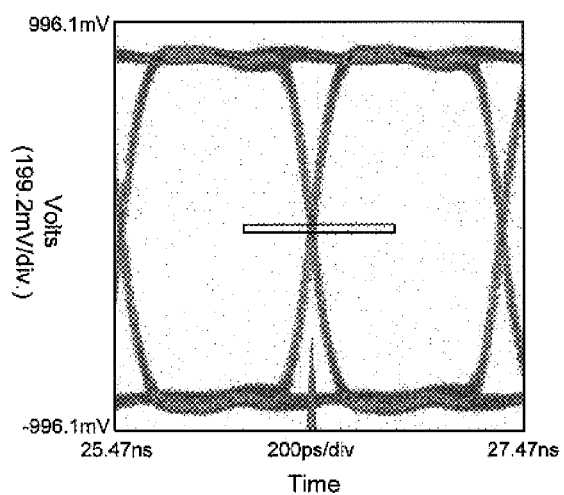
FIG. 6 is a waveform diagram illustrating a measured serial data output generated using a 106.25 MHz reference clock and by repeating by each bit in the data stream, according to one embodiment of the present invention.

FIG. 6 shows a waveform generated by the GigaBlaze G12 transceiver by repeating each bit in the data stream and using a 106.125 MHz reference clock. Emphasis was applied for 470 ps, which is the unit interval at 2.125 Gb/s. This better use of emphasis results in substantially lower deterministic jitter (inter-symbol interference). The jitter performance is also improved by allowing the PLL to operate within a narrower and more optimum control range while supporting a larger span of data rates. Hence, the jitter performance is not compromised for the lower effective data rates, such as 1 Gb/s.

The block diagram shown in FIG. 3 is provided as an example only. Any circuit that is capable of repeating each bit one or more times to form an expanded data word can be used in alternative embodiments of the present invention. Many modifications can be made. For example since the multiplexer elements 314 in each pair of elements have the same inputs, half of the elements in multiplexer 310 can be eliminated. The outputs of each remaining element 314 would be coupled to the inputs of two adjacent elements 320 in bypass multiplexer 312.

In addition, the bit repeating circuit shown in FIG. 3 can be expanded to allow for any number of selectable data rates. For example, bit repeating circuit 304 can be expanded to allow selection between 1 Gb/s, 2 Gb/s or 4 Gb/s data rates. In this embodiment, serializer 305 would operate at the maximum supported data rate (4 Gb/s). To transmit data at 1 Gb/s, each bit of parallel data would be multiplied or repeated four times and transmitted at 4 Gb/s. To transmit data at 2 Gb/s, each bit of parallel data is multiplied or repeated two times and transmitted at 4 Gb/s. In this embodiment, each multiplexer element 314 would have four inputs for selecting between bit locations of four different portions of register 302. The multiplexer select input 316 would be operated to sequentially select between the four sequential portions of register of 302. In one embodiment, each selectable data rate is a power of two relative to the other data rates. Therefore, the number of times each bit is repeated with each selectable data rate is also a power of two. Other combinations of data rates can also be used with suitable expansion of multiplexer 310 and control of the multiplexing select circuitry.

Although the present invention has been described with reference to preferred embodiments, workers skilled in the art will recognize that changes may be made in form and detail without departing from the spirit and scope of the invention. For example, the transmitter can have a data path with any number of bits in alternative embodiments of the present invention. Thus, the term "data word" used in the specification and claims can include any number of bits. The term "coupled" can include various types of connections or couplings and can include a direct connection or a connection thorough one or more intermediate components.

What is claimed is:

1. A method of transmitting serial data, the method comprising:
   a) receiving successive transmit data words, wherein each transmit data word has a plurality of bits;
   b) selecting between first and second transmit frequencies as a desired transmit frequency, wherein the second transmit frequency is a multiple number of the first transmit frequency;
   c) multiplying each of the plurality of bits in each transmit data word into a multiple number of adjacent bits to form an expanded data word;
   d) serializing the expanded data words formed in step c) if the desired transmit frequency is the first transmit frequency, or serializing the transmit data words received in step a) if the desired transmit frequency is the second transmit frequency to form a serial data word stream; and
   e) transmitting the serial data word stream.

2. The method of claim 1, wherein:
   step a) comprises receiving the successive transmit data words at the desired transmit frequency; and
   step e) comprises transmitting the serial data word stream at the second transmit frequency, regardless of the desired transmit frequency.

3. The method of claim 2 wherein step a) comprises latching each successive transmit data word in a transmit data register at the desired transmit frequency.

4. The method of claim 2 wherein:
   step c) comprises multiplying each of the plurality of bits in each transmit data word into multiple adjacent bits to form the expanded data word, wherein the number of adjacent bits in the expanded data word for each bit in the transmit data word is equal to the multiple number.

5. The method of claim 4 wherein step c) further comprises:
   c)1) for each successive transmit data word received in step a), sequentially selecting between subsets of the bits in the transmit data word, wherein the number of subsets is equal to the multiple number; and
   c)2) for each subset, multiplying each of the bits in that subset into the multiple number of adjacent bits to form a portion of the expanded data word.

6. The method of claim 5 wherein step d) comprises:
   d)1) sequentially passing each portion of the expanded data word to a data serializer if the desired transmit frequency is the first transmit frequency; or
   d)2) sequentially passing the successive transmit data words received in step a) to the data serializer if the desired transmit frequency is the second transmit frequency to form a serial data word stream.

7. A method of transmitting data, the method comprising:
   a) selecting between first and second transmit frequencies as a desired transmit frequency, wherein the second transmit frequency is a multiple number of the first transmit frequency;
   b) receiving successive transmit data words, wherein each transmit data word has a plurality of bits;
   c) multiplying each of the plurality of bits in each transmit data word into multiple adjacent bits to form an expanded data word, if the desired transmit frequency is the first transmit frequency, wherein the number of adjacent bits in the expanded data word for each bit in the transmit data word is equal to the multiple number;
   d) serializing the expanded data words formed in step c) if the desired transmit frequency is the first transmit frequency, or serializing the transmit data words received in step b) if the desired transmit frequency is the second transmit frequency to form a serial data word stream; and
   e) transmitting the serial data word stream at the second transmit frequency, regardless of the desired transmit frequency.

8. The method of claim 7 wherein step b) comprises latching each successive transmit data word in a transmit data register at the desired transmit frequency.

9. The method of claim 7 wherein step c) comprises:
   c)1) for each successive transmit data word received in step b), sequentially selecting between subsets of the bits in the transmit data word, wherein the number of subsets is equal to the multiple number; and
   c)2) for each subset, multiplying each of the bits in that subset into the multiple number of adjacent bits to form a portion of the expanded data word.

10. The method of claim 9 wherein step d) comprises:
    d)1) sequentially passing each portion of the expanded data word to a data serializer if the desired transmit frequency is the first transmit frequency; or
    d)2) sequentially passing the successive transmit data words received in step b) to the data serializer if the desired transmit frequency is the second transmit frequency to form a serial data word stream.

11. A data transmitter comprising:
    a parallel transmit data input for receiving successive transmit data words having a plurality of bits;
    a transmit register coupled to the parallel data input for storing the successive transmit data words;
    a bit repeating circuit coupled to the transmit register, having a first data path and a second, alternate data path, which is multiplexed with the first data path, wherein the first data path applies the transmit data word stored in the transmit register to a parallel transmit data output and the second data path repeats each of the plurality of bits in each transmit data word to form a multiple number of adjacent bits within an expanded data word and applies the expanded data word to the parallel transmit data output; and
    a data serializer coupled to the parallel transmit data output and having a serial data output.

12. The data transmitter of claim 11 wherein the bit repeating circuit comprises:
    a bit repeating multiplexer along the second data path, which selects between multiple sets of inputs, wherein the number of sets is equal to the multiple number of adjacent bits and each set is coupled to a respective portion of the transmit register, and wherein the bit repeating circuit has a set of expanded multiplexer outputs; and a bypass multiplexer having a first set of inputs coupled to the transmit register along the first data path, a second set of inputs coupled to the set of expanded multiplexer outputs along the second data path, and a further set of multiplexer outputs, which forms the parallel transmit data output and is coupled to the data serializer.

13. The data transmitter of claim 11 wherein the multiple number is a power of 2.

14. The data transmitter of claim 11 wherein the multiple number is selected from the group consisting of 2 and 4.

15. The data transmitter of claim 12 wherein the transmit register has a clock input and the bit repeating multiplexer has a select input, which is coupled to the clock input of the transmit register.

* * * * *